(12) United States Patent
Takigahira et al.

(10) Patent No.: US 10,883,606 B2
(45) Date of Patent: Jan. 5, 2021

(54) MECHANICAL SEAL

(71) Applicants: EAGLE INDUSTRY CO., LTD., Tokyo (JP); EAGLEBURGMANN JAPAN CO., LTD., Tokyo (JP)

(72) Inventors: Yoshiaki Takigahira, Tokyo (JP); Masakazu Kito, Tokyo (JP)

(73) Assignees: EAGLE INDUSTRY CO., LTD.; EAGLEBURGMANN JAPAN CO., LTD.

(\*) Notice: Subject to any disclaimer, the term of this patent is extended or adjusted under 35 U.S.C. 154(b) by 0 days.

(21) Appl. No.: 16/084,924

(22) PCT Filed: Apr. 14, 2017

(86) PCT No.: PCT/JP2017/015254
§ 371 (c)(1),
(2) Date: Sep. 13, 2018

(87) PCT Pub. No.: WO2017/188024
PCT Pub. Date: Nov. 2, 2017

(65) Prior Publication Data
US 2019/0078689 A1 Mar. 14, 2019

(30) Foreign Application Priority Data
Apr. 27, 2016 (JP) ................. 2016-089536

(51) Int. Cl.
*F16J 15/34* (2006.01)
*F16J 15/36* (2006.01)
*F16J 15/38* (2006.01)

(52) U.S. Cl.
CPC ......... *F16J 15/363* (2013.01); *F16J 15/3452* (2013.01); *F16J 15/3464* (2013.01); *F16J 15/36* (2013.01); *F16J 15/38* (2013.01)

(58) Field of Classification Search
CPC .... F16J 15/363; F16J 15/3452; F16J 15/3464; F16J 15/36; F16J 15/38
See application file for complete search history.

(56) References Cited

U.S. PATENT DOCUMENTS

| 5,551,708 A | 9/1996 | Vesey et al. ............. F16J 15/38 |
| 6,311,983 B1 * | 11/2001 | Burcham ............... F16J 15/002 277/370 |

(Continued)

FOREIGN PATENT DOCUMENTS

| CN | 101438085 | 5/2009 | ............... F16J 15/38 |
| CN | 202140570 | 2/2012 | |

(Continued)

OTHER PUBLICATIONS

International Preliminary Report on Patentability issued in application No. PCT/JP2017/015254, dated Nov. 8, 2018 (6 pgs).

(Continued)

*Primary Examiner* — Gilbert Y Lee
(74) *Attorney, Agent, or Firm* — Hayes Soloway P.C.

(57) ABSTRACT

In a bellows mechanical seal, a collar attached to a seal ring through a bellows has a restriction piece extending toward at least one of an inner diameter side or an outer diameter side. The bellows mechanical seal includes an adaptor which is attached to the collar, whose axial movement is restricted by the restriction piece, and which extends to the inner diameter side or the outer diameter side over the restriction piece. The collar and the adaptor form at least part of a housing space (S), (S') having the secondary seal housed therein.

12 Claims, 14 Drawing Sheets

(56) References Cited

U.S. PATENT DOCUMENTS

| | | | | |
|---|---|---|---|---|
| 7,611,151 | B2 | 11/2009 | Casucci et al. | 277/390 |
| 9,400,054 | B2 | 7/2016 | Suefuji | F16J 15/36 |
| 2002/0074732 | A1* | 6/2002 | Burroughs | F16J 15/363 |
| | | | | 277/390 |
| 2005/0194746 | A1* | 9/2005 | Grace | F16J 15/3236 |
| | | | | 277/358 |
| 2009/0085300 | A1 | 4/2009 | Takahashi | 277/391 |
| 2014/0147302 | A1 | 5/2014 | Howell et al. | F04B 39/00 |
| 2015/0184754 | A1 | 7/2015 | Furukawa et al. | F16J 15/3464 |

FOREIGN PATENT DOCUMENTS

| | | | | |
|---|---|---|---|---|
| CN | 104995440 | 10/2015 | | F16J 15/34 |
| JP | H068868 | 2/1994 | | F16J 15/34 |
| JP | 2000097349 | 4/2000 | | F16J 15/36 |
| JP | 4076626 | 4/2008 | | F16J 15/36 |
| WO | WO2014034582 | 3/2014 | | F16J 15/36 |

OTHER PUBLICATIONS

International Search Report (w/translation) and Written Opinion issued in application No. PCT/JP2017/015254, dated Jul. 11, 2017 (8 pgs).
Chinese Office Action issued in application No. 201780024173.9, dated Sep. 4, 2019 (12 pgs).
European Search Report issued in application No. 17789310.4, dated Nov. 11, 2019 (6 pgs).
Chinese Official Action issued in related Chinese Patent Application Serial No. 201780024173.9, dated May 11, 2020 with English translation (11 pages).
European Official Action issued in related European Patent Application Serial No. 17789310.4, dated Jul. 2, 2020 (5 pages).

* cited by examiner

MECHANICAL SEAL

TECHNICAL FIELD

The present invention relates to a bellows mechanical seal.

BACKGROUND ART

A bellows mechanical seal is configured to slide a seal ring and a mating ring in an axial direction to form a primary seal, thereby sealing a border between the inside and outside of the rings in a radial direction, disposed between a rotary shaft and a housing. A collar, a bellows, and the seal ring are arranged in the description this order on a seal ring side, an O-ring is disposed in an annular groove at the inner or outer periphery of the collar attached to one end of the bellows, and a secondary seal is formed between the collar and the rotary shaft or between the collar and the housing, thereby reducing leakage of sealing target fluid from the periphery of the collar.

The bellows mechanical seal includes a stationary type bellows mechanical seal called a stationary type and configured such that a bellows is attached to a housing side, and a rotating type bellows mechanical seal called a rotating type and configured such that a bellows is attached to a rotary shaft side (these types of mechanical seals will be hereinafter merely referred to as a "stationary type" and a "rotating type"). For reducing the number of components, it has been proposed as follows: an annular recessed portion is provided on each of an outer diameter side and an inner diameter side of a collar; an O-ring is disposed in the outer-diameter-side annular recessed portion of the collar in the case of the stationary type, and on the other hand, is disposed in the inner-diameter-side annular recessed portion of the collar in the case of the rotating type; and therefore, the common collar can be used for any of the stationary type and the rotating type (see, e.g., Patent Citation 1).

CITATION LIST

Patent Literature

Patent Citation 1: JP 4076626 (paragraph 0016, paragraph 0020, FIG. 2, FIG. 3)

SUMMARY OF INVENTION

Technical Problem

However, in the typical collar, the annular recessed portion is provided on each of the outer and inner diameter sides, and the O-ring is disposed in one of the annular recessed portions. Thus, even on an annular recessed portion side on which the O-ring is not disposed, the collar needs a wall portion extending in a radial direction for formation of the annular recessed portion. For this reason, arrangement of the collar and the O-ring is limited because such arrangement depends on the shape of the collar.

The present invention has been made focusing on the above-described problem, and is intended to provide a bellows mechanical seal with a high degree of freedom in arrangement of a collar and a secondary seal.

Solution to Problem

For solving the above-described problem, the bellows mechanical seal according to a first aspect of the present invention is a bellows mechanical seal characterized by including a seal ring, a collar attached to the seal ring through a bellows, a mating ring slidably contacting the seal ring, and a secondary seal configured to seal a gap between the collar and a rotary shaft or between the collar and a housing. The collar has a restriction piece extending toward at least one of an inner diameter side and an outer diameter side. The bellows mechanical seal further includes an adaptor which is attached to the collar, whose axial movement is restricted by the restriction piece, and which extends to the inner diameter side or the outer diameter side over the restriction piece. The collar and the adaptor define at least part of a housing space having the secondary seal housed therein.

According to the first aspect, the housing space can be changed according to the adaptor to be used, and therefore, the bellows mechanical seal with a high degree of freedom in arrangement of the collar and the secondary seal.

The bellows mechanical seal according to a second aspect of the present invention is characterized in that the collar has the restriction piece extending to the inner diameter side and the outer diameter side.

According to the second aspect, the adaptor is selectively attached to the inner-diameter-side or outer-diameter-side restriction piece. Thus, the bellows and the collar can be used for both of a rotating type and a stationary type, and a region occupied by the collar on a side not attached to the adaptor can be decreased.

The bellows mechanical seal according to a third aspect of the present invention is characterized in that the restriction piece and the adaptor are in an endless annular shape.

According to the third aspect, an allowance for engagement between the restriction piece and the adaptor is large, and these components can be supported with force being dispersed in a circumferential direction. Consequently, the restriction piece and the adaptor can be configured small.

The bellows mechanical seal according to a fourth aspect of the present invention is characterized in that the adapter is provided with a step portion extending to an outer peripheral side or an inner peripheral side, and the restriction piece is brought into contact with the step portion in an axial direction.

According to the fourth aspect, the restriction piece and the adaptor engage (so-called inlay engagement) with each other by the step. Consequently, an engagement state is stabilized.

The bellows mechanical seal according to a fifth aspect of the present invention is characterized in that the collar is directly or indirectly fixed to the rotary shaft or the housing in the axial direction by a screwing member.

According to the fifth aspect, the secondary seal can be, in a compressed state in the axial direction, attached directly or indirectly by the rotary shaft and the adaptor or by the housing and the adaptor.

The bellows mechanical seal according to a sixth aspect of the present invention is characterized in that the secondary seal includes, as a main component, any of graphite, PTFE, and metal.

According to the sixth aspect, even in the case of a secondary seal exhibiting less elasticity than that of a secondary seal using rubber as the main component, the secondary seal can be attached from the opposite side of the restriction piece. This leads to favorable assembling performance.

DESCRIPTION OF EMBODIMENTS

The embodiments of the bellows mechanical seal according to the present invention will be described below with reference to examples. In the embodiments, the direction of extending a rotary shaft axis is referred to as an "axial direction", and the direction perpendicular to the axis is referred to as a "radial direction." Moreover, for the sake of convenience of description, a sectional view of an annular member illustrates only a cut plane, and lines extending in the radial direction and indicating an uncut portion are not shown in each figure. Of both ends in the axial direction, a left end as viewed in the figure is described as one end, and a right end as viewed in the figure is described as the other end.

First Embodiment

The first embodiment of the bellows mechanical seal according to the present invention will be described with reference to FIGS. 1 to 6.

Figure 1A:
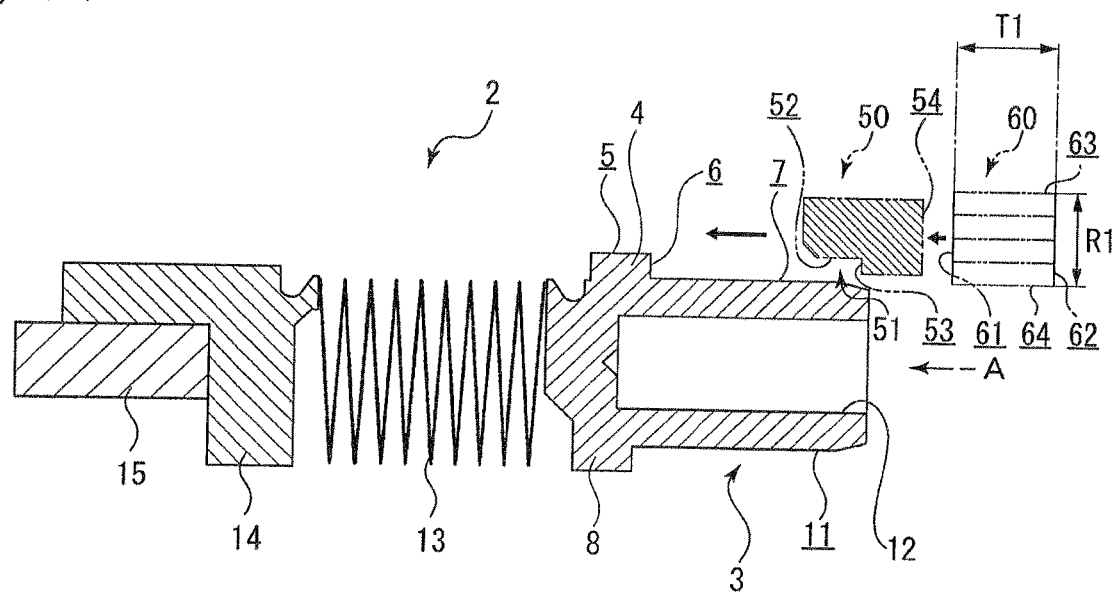
FIG. 1 is a sectional view showing a bellows unit of a first embodiment of the bellows mechanical seal according to the present invention, FIG. 1A being a sectional view of the bellows unit including a secondary seal attached to an outer diameter side of a collar and FIG. 1B being a sectional view of the bellows unit including a secondary seal attached to an inner diameter side of the collar.
Figure 1B:
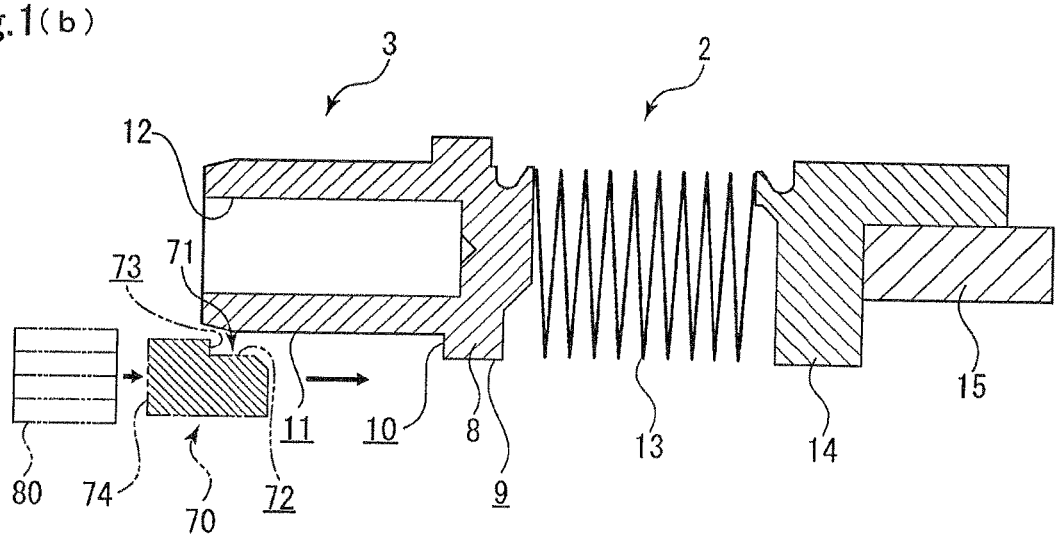

The bellows mechanical seal 1 is attached between a rotary shaft 39 and a housing 40, and is configured to seal a space between the rotary shaft 39 and the housing 40. The bellows mechanical seal 1 mainly includes a collar 3, a bellows 13, a retainer 14, a seal ring 15, and a mating ring 17. The collar 3, the bellows 13, the retainer 14, and the seal ring 15 are integrally coupled together, thereby forming a bellows unit 2. Note that the bellows unit 2 is common between a stationary type and a rotating type. FIG. 1A illustrating a secondary seal disposed on an outer diameter side will be described, and FIG. 1B illustrating the secondary seal disposed on an inner diameter side will not be described.

Figure 2:
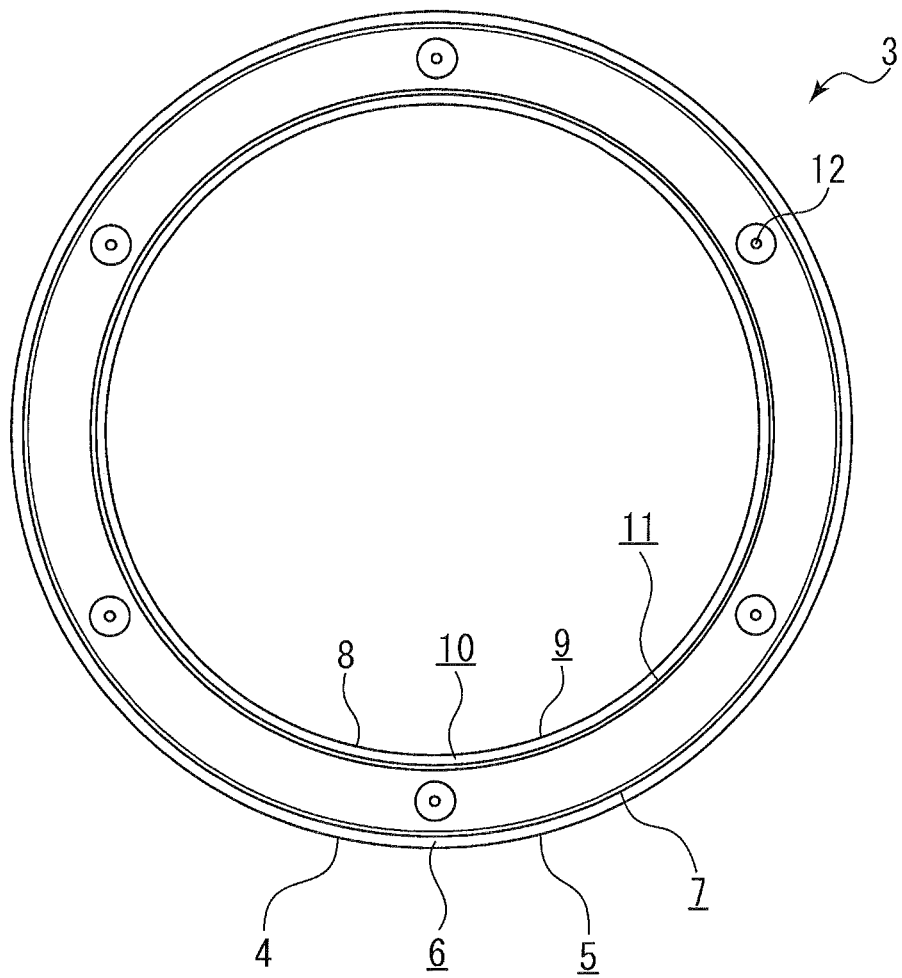
FIG. 2 is a sectional view of the collar of FIG. 1 along an arrow A.
Figure 3:
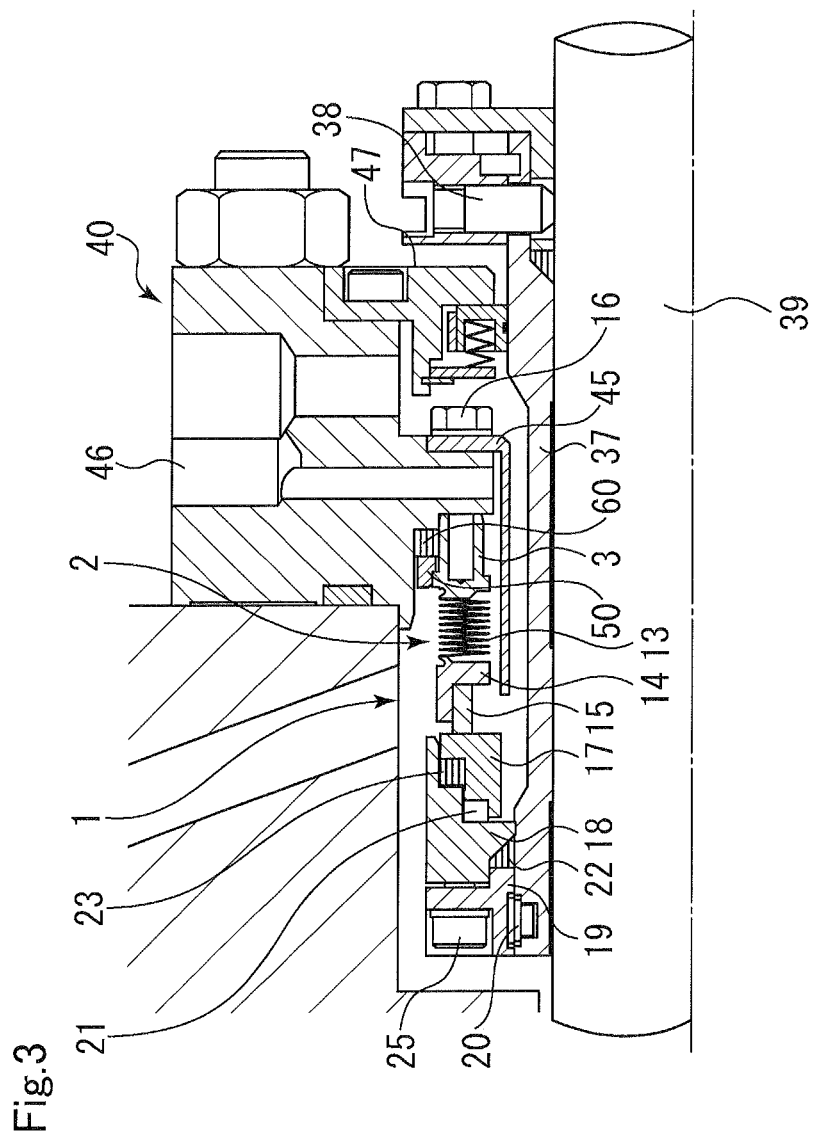
FIG. 3 is a sectional view of an example of the first embodiment in use for a stationary bellows mechanical seal.

As illustrated in FIG. 2, the collar 3 is made of metal, and formed in an annular shape. The collar 3 is, at the inner and outer peripheries of one end portion in the axial direction, provided with an annular flange 4 (a restriction piece) extending in an outer diameter direction and an annular flange 8 (a restriction piece) extending in an inner diameter direction, as well as being provided with threaded screw holes 12 extending in the axial direction at the other end portion in the axial direction. Note that the collar 3 may be made of other materials than the metal, such as resin.

The bellows 13 is formed as follows: a plurality of metal diaphragm plates formed in a corrugated annular shape by punching etc. are arranged in line, and by gas welding etc., outer diameter portions of adjoining two of the diaphragm plates are coupled together and inner diameter portions of adjoining two of the diaphragm plates are coupled together; and then, the resultant is entirely formed in an annular bellows cylindrical shape. The other end of the bellows 13 is integrally coupled to the collar 3 by gas welding etc. Note that the bellows 13 may be made of other materials than the metal, such as resin.

The retainer 14 is made of metal, and is formed in an annular shape. One end portion of the retainer 14 on an inner peripheral side is provided with an annular step portion, and the outer periphery of the seal ring 15 is fitted into this step portion. The one end of the bellows 13 is integrally coupled to the retainer 14 by gas welding etc. Note that the retainer 14 may be made of other materials than the metal, such as resin.

The seal ring 15 is made of carbon, and is formed in an annular shape. An outer peripheral side of the seal ring 15 is fitted into the step portion of the retainer 14 such that the seal ring 15 is integrally attached to the retainer 14. The one end of the seal ring 15 in the axial direction is provided with a seal face substantially perpendicular to the axial direction. Note that the seal ring 15 may be made of other materials than the carbon, such as metal or SiC (silicon carbide).

The mating ring 17 (see FIGS. 3 and 4) is made of SiC, and is formed in an annular shape. The one end of the mating ring 17 in the axial direction is provided with a seal face substantially perpendicular to the axial direction. Note that the mating ring 17 may be made of other materials than SiC, such as metal or carbon.

Next, the case of using the bellows mechanical seal 1 as the stationary type will be described mainly with reference to FIGS. 1A, 2, 3, and 4.

The collar 3 is attached to the housing 40 through set screws 16 (screwing members) in a state in which an annular socket ring 50 (an adaptor) and an annular rectangular-sectional packing 60 (the secondary seal) are attached to the outer diameter side of the collar 3, and the mating ring 17 is attached to the rotary shaft 39 through a retainer 18, a connection ring 19, etc.

Figure 4:
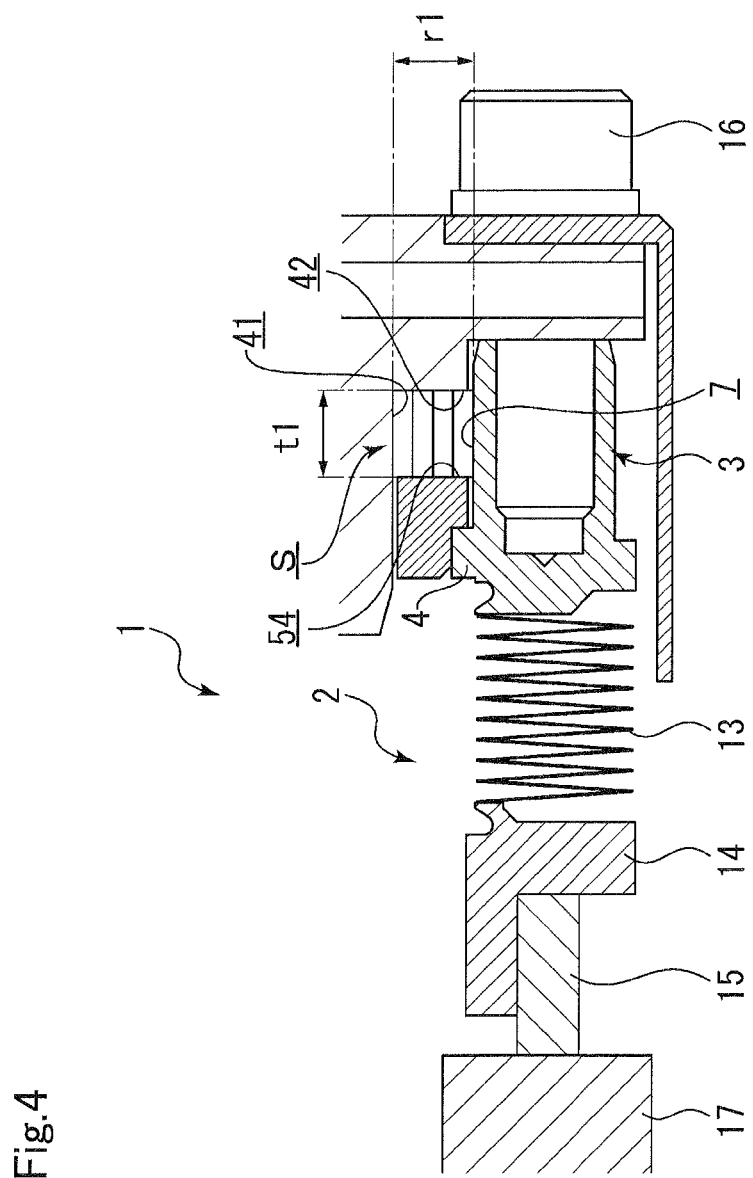
FIG. 4 is a sectional view of a main portion of FIG. 3.
Figure 5:
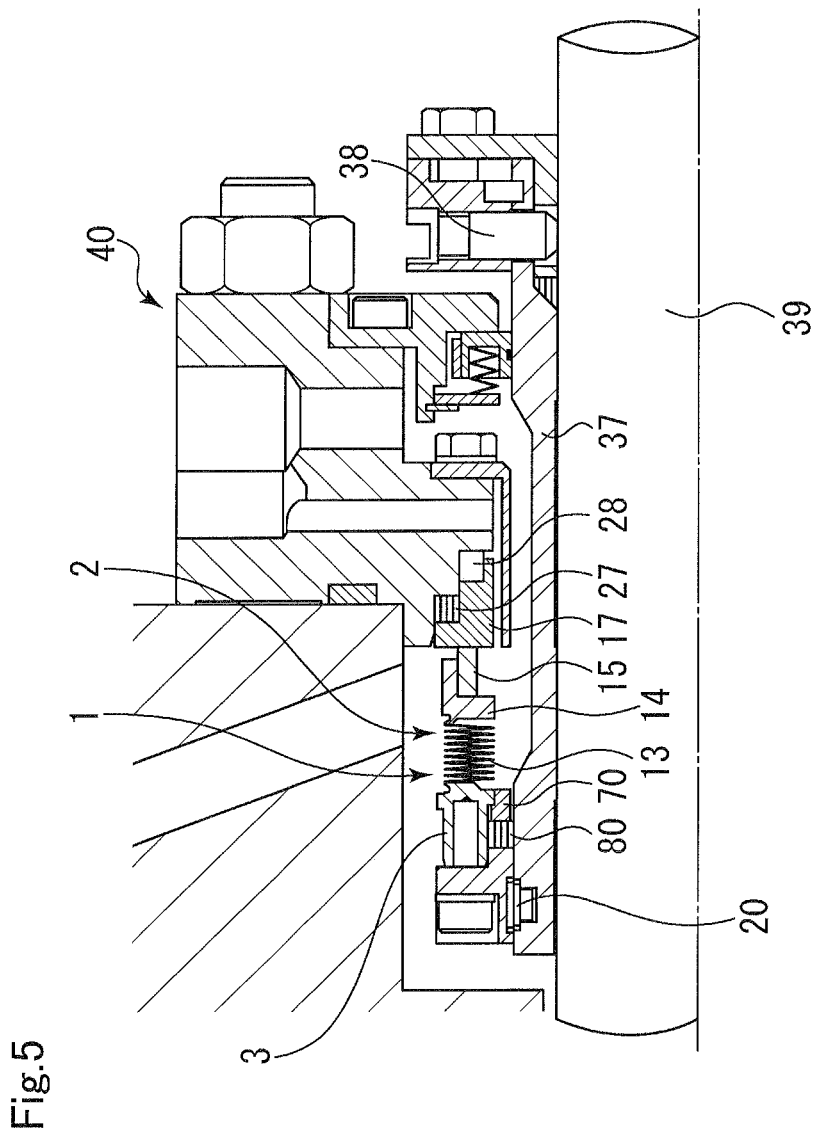
FIG. 5 is a sectional view of another example of the first embodiment in use for a rotating type bellows mechanical seal.
Figure 6:
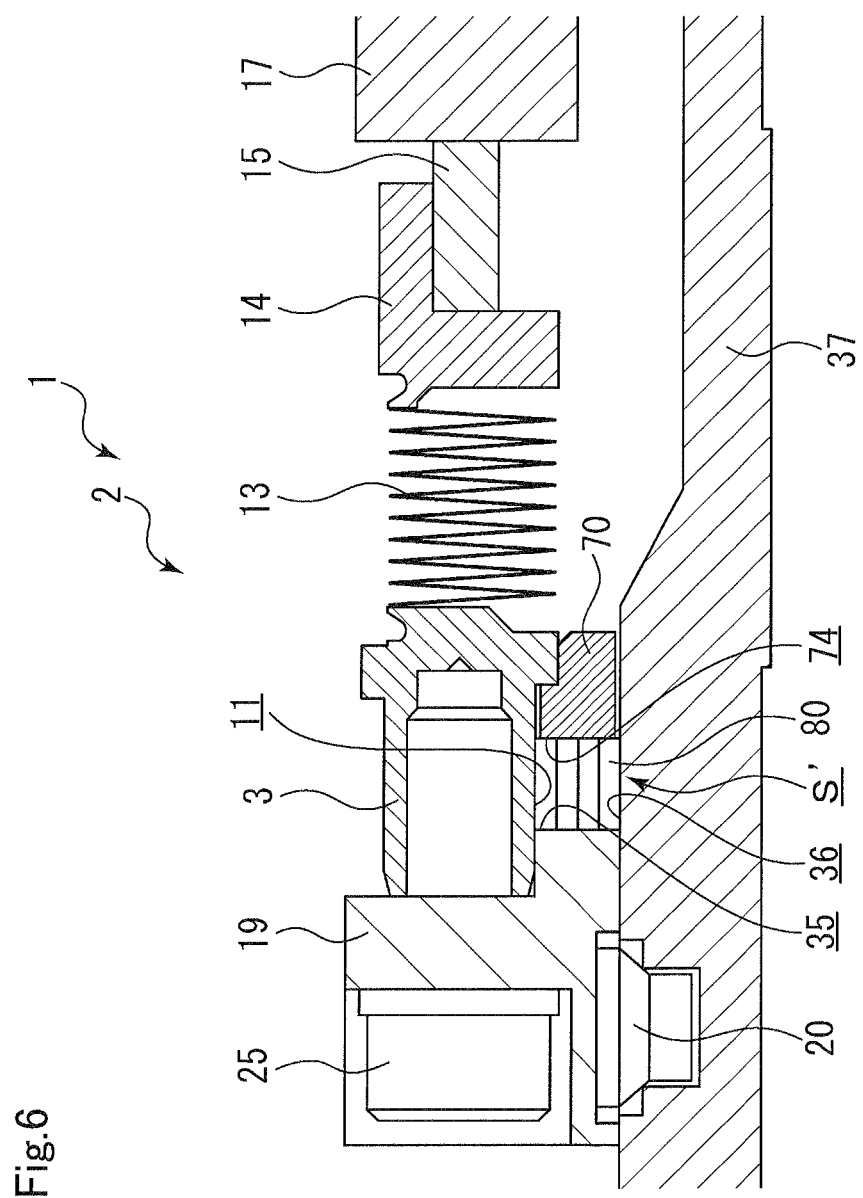
FIG. 6 is a sectional view of a main portion of FIG. 5.

The socket ring 50 is made of metal. The inner diameter side of the socket ring 50 on one end side in the axial direction is provided with an annular step portion 51. The socket ring 50 has a substantially L-shape section. An inner peripheral face 52 of the step portion 51 and an outer peripheral face 5 of the flange 4 are formed to have the substantially same diameter. The socket ring 50 can be fixed by press-fitting onto the collar 3 in the axial direction. In a state in which the socket ring 50 is attached to the collar 3, a side face 53 of the step portion 51 contacts a side face 6 of the flange 4 on the other end side, and therefore, the axial movement of the socket ring 50 toward the one end side is restricted. Moreover, an outer peripheral face 7 of the collar 3, a side face 54 of the socket ring 50 on the other end side in the axial direction, an inner peripheral face 41 of the housing 40, and an inner face 42 of the housing 40 form a housing space S configured to house the rectangular-sectional packing 60 (FIG. 4). Note that the socket ring 50 may be made of other materials than the metal, such as resin.

The rectangular-sectional packing 60 is formed with a rectangular section. A thickness T1 (FIG. 1A) as the axial length of the rectangular-sectional packing 60 is slightly greater than the axial length t1 (a distance between the side face 54 and the inner face 42) of the housing space S (FIG. 4), and a radial width R1 as the radial length of the rectangular-sectional packing 60 is slightly smaller than the radial length r1 (a distance between the outer peripheral face 7 and the inner peripheral face 41) of the housing space S. By tightening of the set screws 16, the rectangular-sectional packing 60 is sandwiched by the side face 54 of the socket ring 50 and the inner face 42 of the housing 40, and is slightly compressed in the axial direction while slightly expanding in the radial direction. Of the rectangular-sectional packing 60, an inner peripheral face 64 contacts the outer peripheral face 7 of the collar 3, and an outer peripheral face 63 closely contacts the inner peripheral face 41 of the housing 40.

Note that the rectangular-sectional packing 60 has been described as an example of the secondary seal, but the shape/material of the secondary seal is not limited. Moreover, the secondary seal is not limited to the secondary seal sandwiched by the side face 54 of the socket ring 50 and the inner face 42 of the housing 40, and may be a secondary seal held only between the inner peripheral face 41 of the housing 40 and the outer peripheral face 7 of the collar 3 in a compressed state. Further, the secondary seal may be a seal (e.g., an annular seal having a C-shaped section) configured to deform, for sealing, by the pressure of sealing target fluid.

Moreover, in the case of sealing a fluid to which an O-ring mainly made of rubber is not applicable, a secondary seal exhibiting smaller contractibility/stretchability than those of the O-ring and mainly made of other materials than the rubber may be used. The secondary seal may be, for example, formed of an annular packing having a rectangular section in the case of using graphite as a main component, an annular V-packing having a V-shaped section or an annular X-ring having an X-shaped section in the case of using PTFE as the main component, and an annular seal having a C-shaped section or an annular metal ring having an E-shaped section in the case of using metal as the main component.

Next, components directly or indirectly fixed to the rotary shaft 39 will be described.

A sleeve 37 is made of metal, and is formed in an annular shape. The sleeve 37 is, in a fixed manner, attached to the rotary shaft 39 through set screws 38. The connection ring 19 is made of metal, and is formed in an annular shape. The connection ring 19 is fixed to the sleeve 37 on the side close to the rotary shaft 39 through set screws 20. The retainer 18 is made of metal, and is formed in an annular shape. A knock pin 21 is disposed between the retainer 18 and the mating ring 17, and therefore, relative rotation of the mating ring 17 and the retainer 18 is restricted.

The retainer 18 is fastened and fixed to the connection ring 19 by set screws 25 in a state in which a rectangular-sectional packing 22 is interposed between the retainer 18 and the connection ring 19, and therefore, seals the outside of the sleeve 37 disposed on the side close to the rotary shaft 39. Moreover, the mating ring 17 is configured to seal a gap between the mating ring 17 and the retainer 18 by fitting an outer peripheral side of the mating ring 17 into an inner peripheral side of the retainer 18 in a state in which a rectangular-sectional packing 23 is interposed between the mating ring 17 and the retainer 18.

Next, an entire configuration of the bellows mechanical seal will be described.

The socket ring 50 and the rectangular-sectional packing 60 are attached in the description order from the other end side of the collar 3 in the axial direction. In this state, the sleeve 37 of the rotary shaft 39 is inserted to an inner peripheral side of the bellows unit 2, and the collar 3 is fitted into the housing 40. Then, each set screw 16 is, in the axial direction, screwed and fastened into a corresponding one of the equally-arranged screw holes 12 (see FIG. 2) of the collar 3, and therefore, the collar 3 is fixed to the housing 40. The seal ring 15 is biased in the direction toward the mating ring 17 by the bellows 13, and the seal face of the seal ring 15 and the seal face of the mating ring 17 are pressed against each other.

As described above, the bellows unit 2 is attached to the housing 40, and the mating ring 17 is attached to the rotary shaft 39. In this state, when the rotary shaft 39 rotates, the seal face of the seal ring 15 and the seal face of the mating ring 17 slidably contact each other to function as a primary seal, and therefore, the space between the rotary shaft 39 and the housing 40 is sealed.

Moreover, the rectangular-sectional packing 60 functions as the secondary seal, and therefore, the space on a side close to the housing 40 is sealed. The rectangular-sectional packings 22, 23 each function as the secondary seal, and therefore, the space on a side close to the rotary shaft 39 is sealed.

Further, the housing 40 is provided with a baffle sleeve 45, a flow path 46, and an atmosphere-side sealing member 47, and therefore, a quenching solution can be introduced through the flow path 46.

Next, the case of using the bellows mechanical seal 1 as the rotating type will be described mainly with reference to FIGS. 1B, 2, 5, and 6. Note that description of configurations similar to those of the stationary type will not be repeated.

The collar 3 is attached to the rotary shaft 39 through the connection ring 19 etc. in a state in which an annular socket ring 70 (the adaptor) and an annular rectangular-sectional packing 80 (the secondary seal) are attached to the inner diameter side, and the mating ring 17 is attached to the housing 40.

The socket ring 70 is provided with an annular step portion 71 on the outer diameter side on the other end side in the axial direction, and has a substantially L-shaped section. An inner peripheral face 72 of the step portion 71 and an outer peripheral face 9 of the flange 8 are formed to have the substantially same diameter. The socket ring 70 can be fixed onto the collar 3 by press-fitting in the axial direction. In a state in which the socket ring 70 is attached to the collar 3, a side face 73 of the step portion 71 contacts a side face 10 of the flange 8 on the one end side, and therefore, the axial movement of the socket ring 70 toward the one end side is restricted. Moreover, an inner peripheral face 11 of the collar 3, a side face 74 of the socket ring 70 on the one end side in the axial direction, an outer peripheral face 36 of the sleeve 37, and a side face 35 of the connection ring 19 form a housing space S' configured to house the rectangular-sectional packing 80.

The rectangular-sectional packing 80 is formed with a rectangular section. A dimensional relationship with the housing space S' is similar to that of the stationary type, and therefore, description thereof will not be repeated.

Moreover, the rectangular-sectional packing 80 has been described as an example of the secondary seal. However, the shape/material of the secondary seal is similar to that of the above-described stationary type, and therefore, description thereof will not be repeated. Further, the material of the socket ring 70 is similar to that of the stationary type, and therefore, description thereof will not be repeated.

The mating ring 17 is, by fitting in, attached to the housing 40. A rectangular-sectional packing 27 is disposed between the mating ring 17 and the housing 40, thereby forming the secondary seal. Moreover, a knock pin 28 is disposed between the mating ring 17 and the housing 40, and therefore, relative rotation of the mating ring 17 and the housing 40 is restricted.

The connection ring 19 is fixed to the sleeve 37 through the set screws 20. The socket ring 70 and the rectangular-sectional packing 80 are attached in the description order from the one end side of the collar 3 in the axial direction. In this state, the sleeve 37 is inserted to the inner peripheral side of the bellows unit 2. Then, each set screw 25 (a screwing member) is screwed and fastened into a corresponding one of the screw holes of the collar 3 from the one end side in the axial direction, and therefore, the collar 3 is fixed to the connection ring 19 on the side close to the rotary shaft 39. The seal ring 15 is biased in the direction toward the mating ring 17 by the bellows 13, and the seal face of the seal ring 15 and the seal face of the mating ring 17 are pressed against each other.

As described above, the bellows unit 2 is attached to the rotary shaft 39, and the mating ring 17 is attached to the housing 40. In this state, when the rotary shaft 39 rotates, the seal face of the seal ring 15 and the seal face of the mating ring 17 slidably contact each other to function as the primary seal, and therefore, the space between the rotary shaft 39 and the housing 40 is sealed.

Moreover, the rectangular-sectional packing 80 functions as the secondary seal, and therefore, the space on a side close to the rotary shaft 39 is sealed. The rectangular-sectional packing 27 functions as the secondary seal, and therefore, the space on a side close to the housing 40 is sealed.

In the case of the stationary type bellows mechanical seal 1 described above, the socket ring 50 is disposed close to the seal ring 15 on an outer peripheral side of the collar 3, and therefore, the socket ring 50 is changed so that the housing space S of the rectangular-sectional packing 60 can be changed. Thus, the degree of freedom in arrangement of the collar 3 and the rectangular-sectional packing 60 is high. As in the stationary type, the housing space S' can be also changed in the case of the rotating type, and therefore, the degree of freedom in arrangement of the collar 3 and the rectangular-sectional packing 80 is high.

Further, the radial length of the flange 4, 8 of the collar 3 is short, and therefore, the size of the collar 3 is not increased in the radial direction. A space occupied by the collar 3 is small on a side on which the socket ring 50, 70 is not disposed, and therefore, the space between the rotary shaft 39 and the housing 40 can be effectively utilized.

In addition, in the case of the stationary type, the radial length of the flange 8 of the collar 3 is short, and the socket ring 70, etc. are not arranged on the inner diameter side. Thus, the collar 3, the bellows 13 coupled to the collar 3, and the seal ring 15 can be downsized in the radial direction.

Moreover, the flanges 4, 8 are provided respectively on the inner and outer diameter sides of the collar 3, and therefore, the collar 3 can be shared between the stationary type and the rotating type. Further, the bellows 13 coupled to the collar 3 and the seal ring 15 can be also shared between the stationary type and the rotating type.

Further, the flanges 4, 8 on the inner and outer diameter sides of the collar 3 and the socket rings 50, 70 are in an endless annular shape. Thus, an engagement allowance in the axial direction is large, and these components can be supported with force being dispersed in the circumferential direction. Consequently, the flanges 4, 8 and the socket rings 50, 70 can be configured small.

In addition, each of the step portions 51, 71 of the socket rings 50, 70 contacts a corresponding one of the flanges 4, 8 on the inner and outer diameter sides of the collar 3 in the axial direction. Thus, the flange 4, 8 and the socket ring 50, 70 engage (so-called inlay engagement) with each other by the step. Consequently, an engagement state is stabilized.

Second Embodiment

Figure 7:
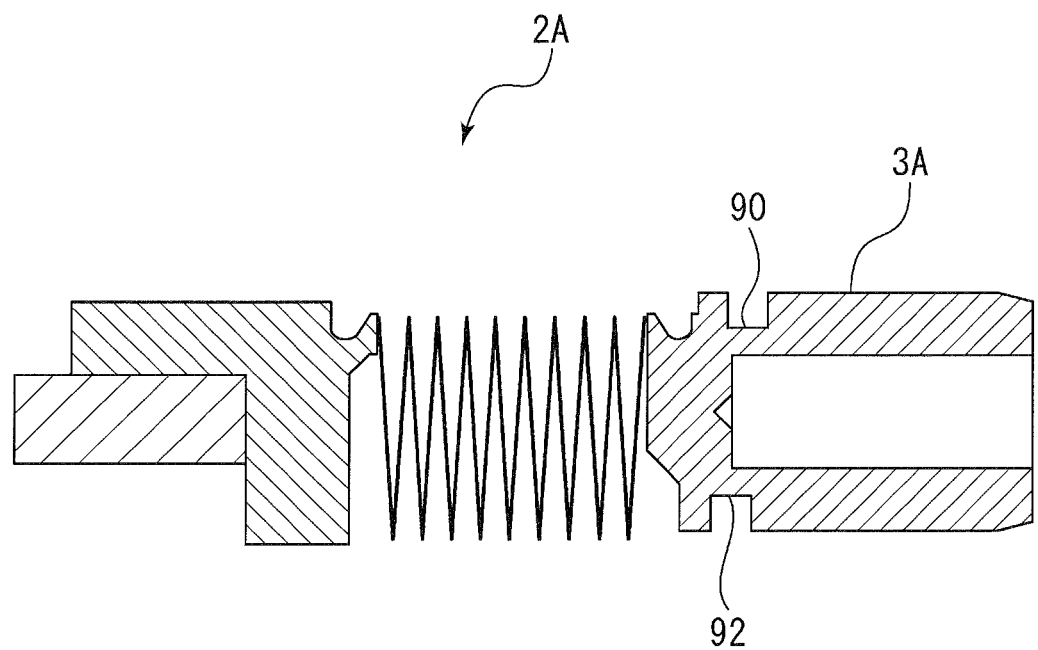
FIG. 7 is a sectional view showing a bellows unit of a second embodiment of the bellows mechanical seal according to the present invention.
Figure 8:
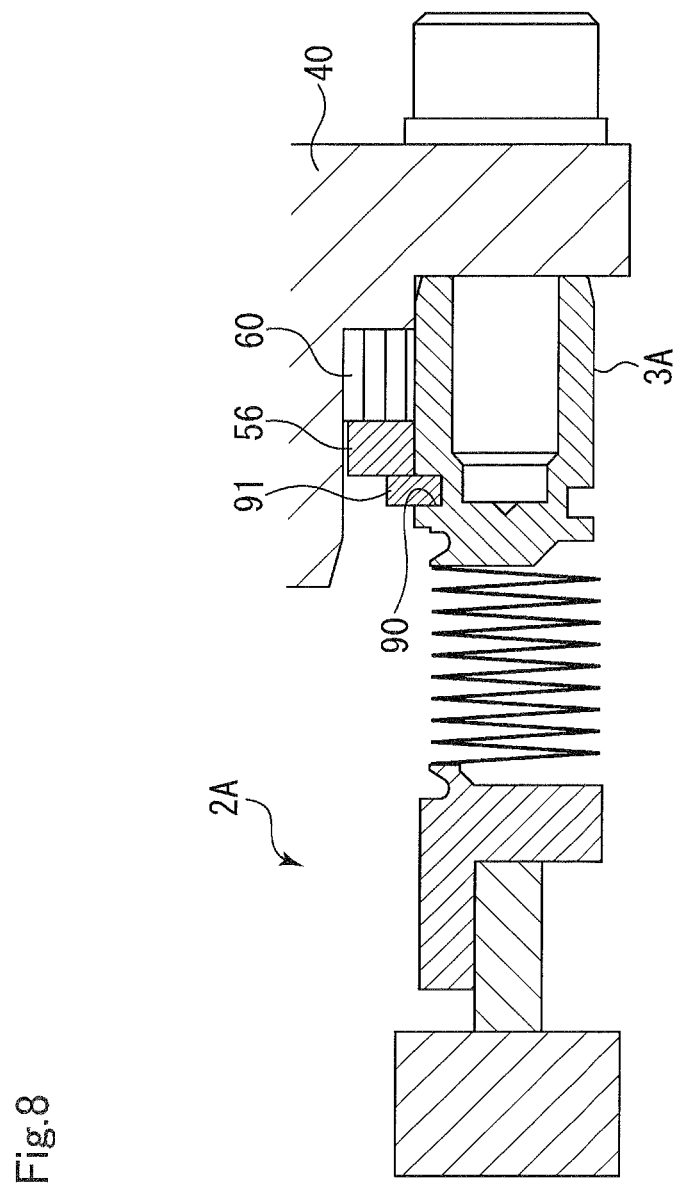
FIG. 8 is a sectional view of a main portion of a stationary type bellows mechanical seal in the second embodiment.
Figure 9:
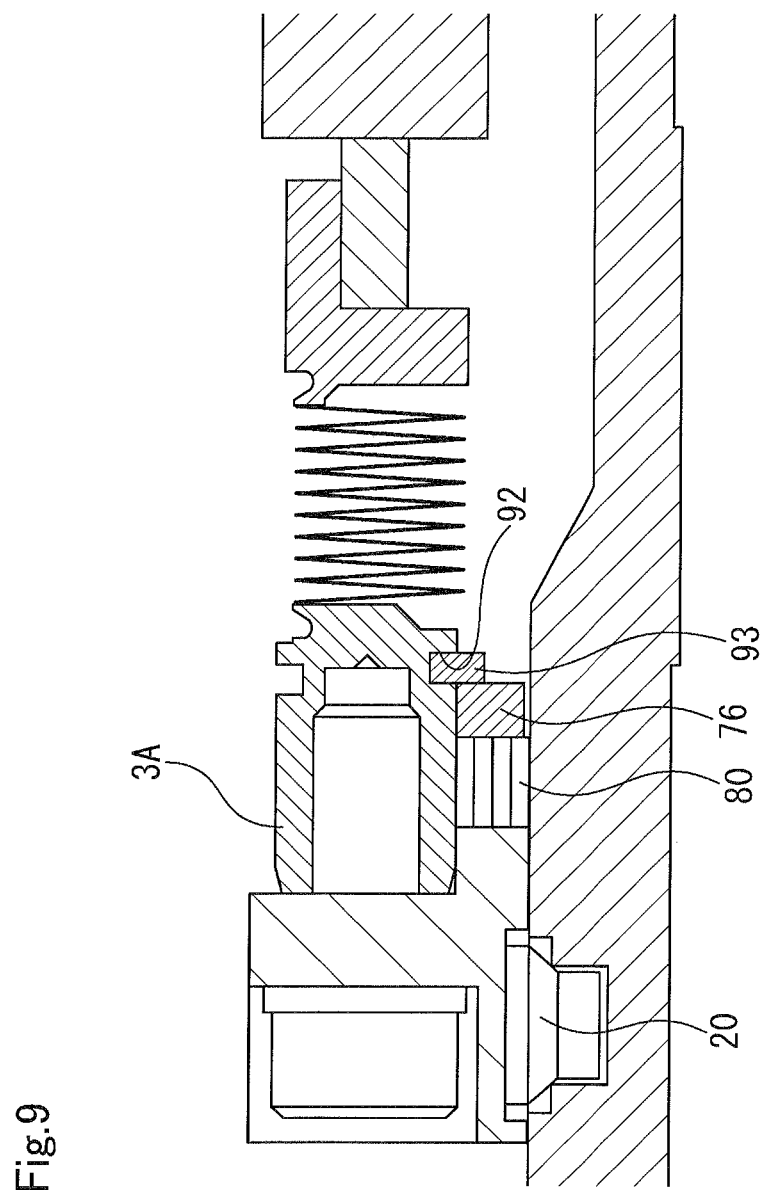
FIG. 9 is a sectional view of a main portion of a rotating type bellows mechanical seal in the second embodiment.

Next, the second embodiment of the bellows mechanical seal according to the present invention will be described with reference to FIGS. 7 to 9. Note that description of the same overlapping configurations as those of the first embodiment will not be repeated. The second embodiment is mainly different from the first embodiment in the configuration for restricting a socket ring in the axial direction.

Annular recessed grooves 90, 92 are provided respectively at the inner and outer peripheries of a collar 3A. In the case of a stationary type, a C-ring 91 (a restriction piece) such as a snap ring having a rectangular section is fitted into the outer-diameter-side recessed groove 90, and axial movement of a socket ring 56 is restricted by the C-ring 91. Note that a rectangular shape has been described as an example of the sectional shape of the socket ring 56, but the socket ring 56 may be provided with a step portion similar to that of the first embodiment such that engagement is made using the step portion. With this configuration, no portion protrudes inward in the radial direction of the collar 3A, leading to more size reduction of the collar 3A.

In the case of a rotating type, a C-ring 93 (a restriction piece) having a rectangular section is fitted in the inner-diameter-side recessed groove 92, and axial movement of a socket ring 76 is restricted by this C-ring 93.

Third Embodiment

Figure 10:
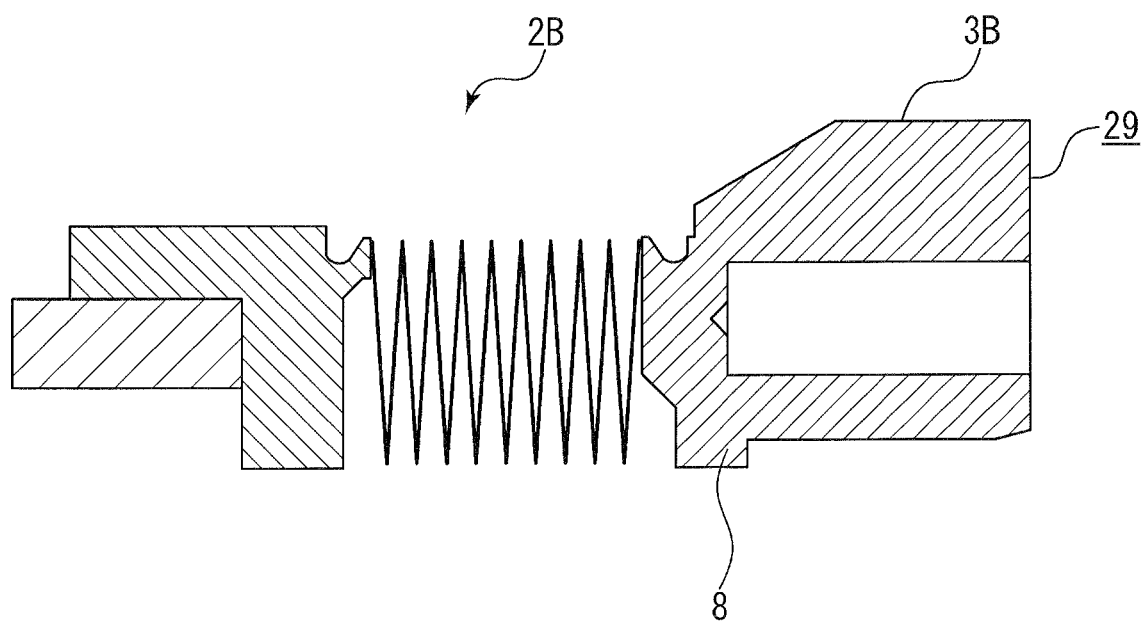
FIG. 10 is a sectional view showing a bellows unit of a third embodiment of the bellows mechanical seal according to the present invention.
Figure 11:
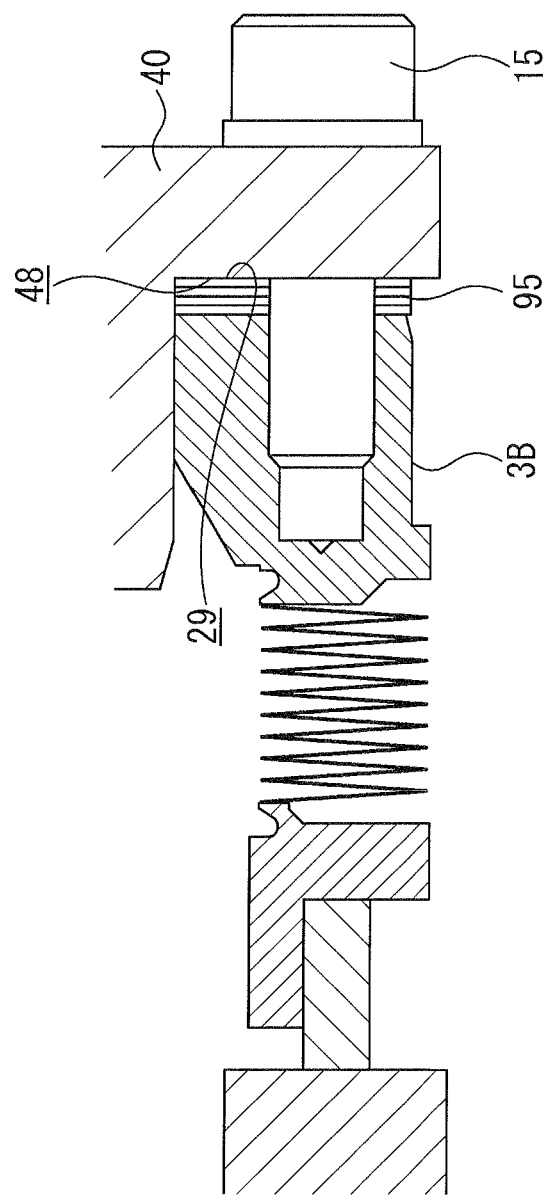
FIG. 11 is a sectional view of a main portion of a stationary type bellows mechanical seal in the third embodiment.
Figure 12:
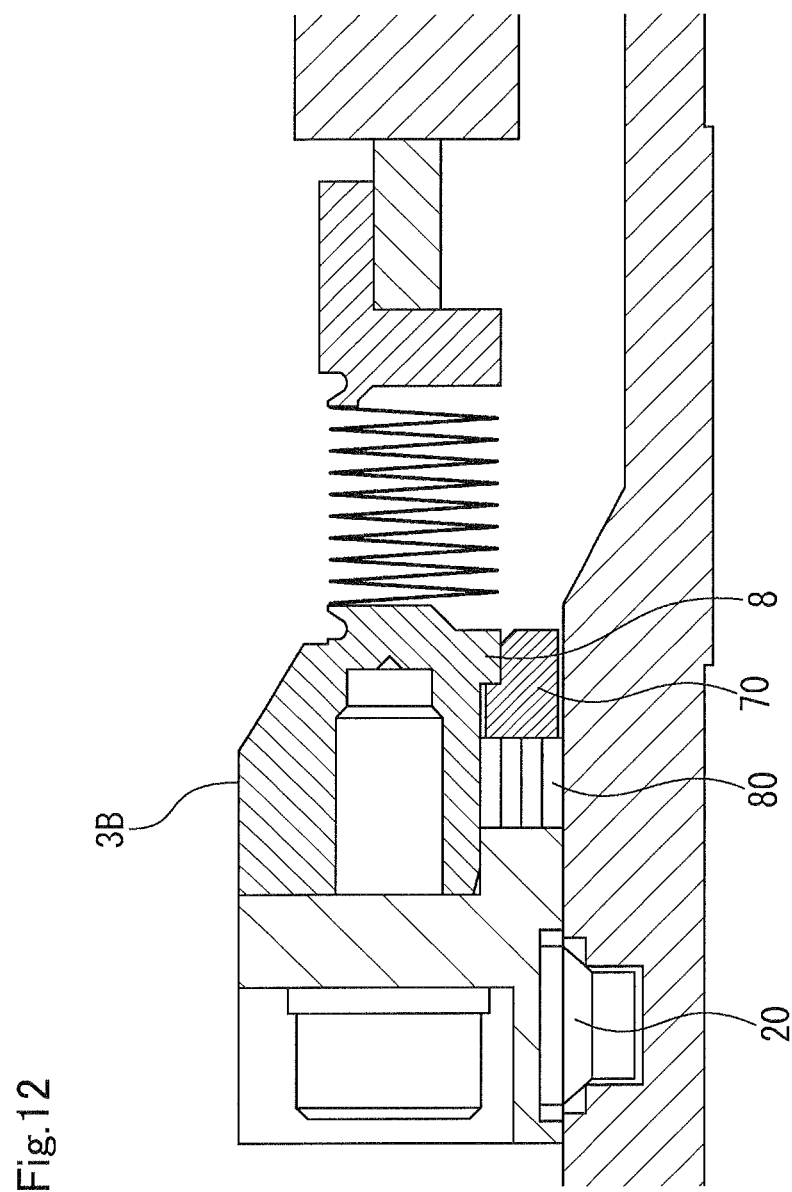
FIG. 12 is a sectional view of a main portion of a rotating type bellows mechanical seal in the third embodiment.

Next, the third embodiment of the bellows mechanical seal according to the present invention will be described with reference to FIGS. 10 to 12. Note that description of the same overlapping configurations as those of the first embodiment will not be repeated. The third embodiment is mainly different from the first embodiment in a configuration not using a rectangular-sectional packing.

A collar 3B is provided with a flange 8 on an inner peripheral side, and forms a flat face on an outer peripheral side. In the case of a stationary type, an annular sheet-shaped gasket 95 mainly made of graphite is disposed between the other end face 29 of the collar 3B in the axial direction and a side end face 48 of a housing 40, thereby functioning as a secondary seal. In the case of a rotating type, a configuration similar to that of the first embodiment is employed. With this configuration, the collar 3B can be shared between the stationary type and the rotating type.

Note that in the third embodiment, the example where the flange 8 is formed only on the inner peripheral side of the collar 3B has been described, but the flange may be formed only on the outer peripheral side of the collar.

Figure 13:
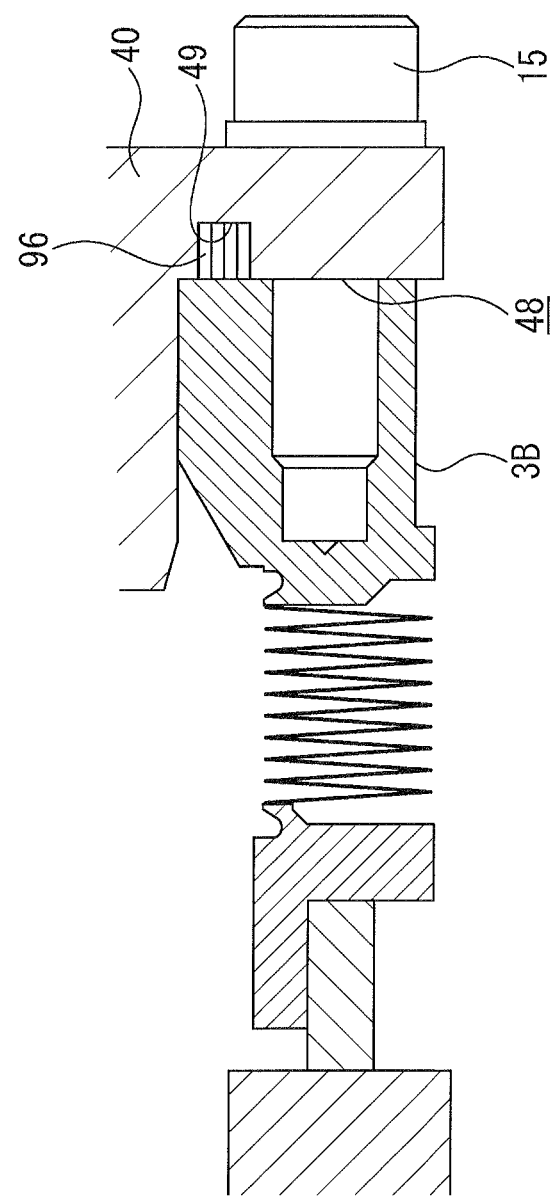
FIG. 13 is a sectional view of a main portion of a stationary type bellows mechanical seal of a variation of the third embodiment.

A variation of the third embodiment may be configured such that an annular groove 49 is provided at the side end face 48 of the housing 40 and a metal ring 96 (the secondary seal) is disposed in the annular groove 49 as illustrated in FIG. 13.

The embodiments of the present invention have been described above with reference to the drawings, but specific configurations are not limited to these embodiments. The present invention also includes changes and additions made without departing from the gist of the present invention.

Figure 14B:
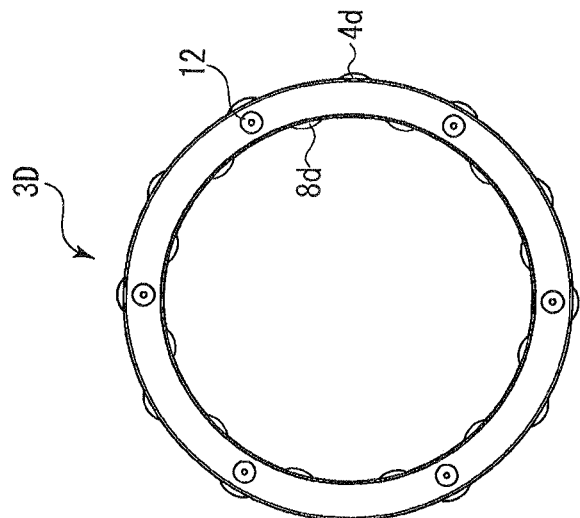
FIGS. 14(a) and 14(b) are views describing variations of the collar in the first to third embodiments.
Figure 14A:
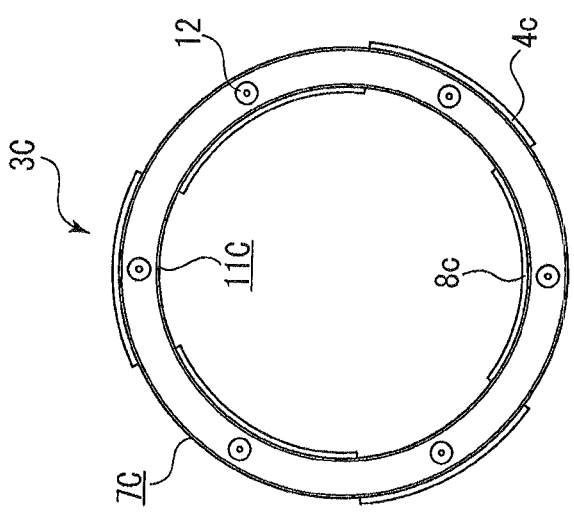

In the first to third embodiments, the cases where any of the flanges 4, 8 of the collars 3, 3A, 3B, the C-rings 91, 93, and the socket rings 50, 56, 70, 76 is in the annular shape have been described, but the shapes of these components may be such a shape that the axial movements of the socket rings 50, 56, 70, 76 can be restricted. For example, as illustrated in FIG. 14A, a plurality of protruding pieces 4c extending from an outer peripheral face 7C of a collar 3C in the outer diameter direction and having a predetermined length in the circumferential direction may be provided, and a plurality of protruding pieces 8c extending from an inner peripheral face 11C of the collar 3C in the inner diameter direction and having a predetermined length in the circumferential direction may be provided. Alternatively, protruding pieces 4d, 8d extending in a wave shape at the inner and outer peripheries of a collar 3D may be provided as illustrated in FIG. 14B. With these shapes, the weights of the collars 3C, 3D can be reduced.

Note that the shapes of the socket rings 50, 70 may be similarly changed.

Moreover, in the first to third embodiments, the socket ring 50, 56, 70, 76 may be or may not be fixed to the collar 3, 3A, 3B. In the case of fixing the socket ring 50, 56, 70, 76, such fixing is made by shrink fitting, cool fitting, bonding, welding, etc.

Further, in the first to third embodiments, the common bellows unit 2, 2A, 2B is preferably used between the stationary type and the rotating type because the number of components is reduced. However, considering contribution to collar size reduction by the restriction piece, it is not intended to exclude use of different bellows units for the stationary type and the rotating type. From a similar point of view, it is not intended to exclude a form in which the secondary seal is attached to an annular recessed groove.

REFERENCE SIGNS LIST 1 bellows mechanical seal
2, 2A, 2B bellows unit
3, 3A, 3B, 3C, 3D collar
4 flange (restriction piece)
4c, 4d protruding piece (restriction piece)
8 flange (restriction piece)
8c, 8d protruding piece (restriction piece)
13 bellows
15 seal ring
16, 25 set screw (screwing member)
17 mating ring
36 outer peripheral face
37 sleeve
39 rotary shaft
40 housing
41 inner peripheral face
42 inner face
48 side end face
50, 56, 70, 76 socket ring (adaptor)
51, 71 step portion
52, 72 inner peripheral face
53, 54, 73, 74 side face
60, 80 rectangular-sectional packing (secondary seal)
63 outer peripheral face
64 inner peripheral face
90, 92 recessed groove
91, 93 C-ring (restriction piece)
95 gasket (secondary seal)
96 metal ring (secondary seal)
R1 radial width
S, S' housing space

The invention claimed is:

1. A bellows mechanical seal comprising:
a seal ring;
a collar attached to the seal ring through a bellows;
a mating ring slidably contacting the seal ring; and
a secondary seal configured to seal a gap between the collar and a rotary shaft or between the collar and a housing,
wherein the collar has, at a first end thereof in an axial direction a restriction piece extending toward at least one of an inner diameter side and an outer diameter side and, at a second end thereof in the axial direction, threaded screw holes extending in the axial direction,
the bellows mechanical seal further includes an adaptor which is attached to the collar, whose axial movement is restricted by the restriction piece, and which extends to the inner diameter side or the outer diameter side over the restriction piece,
the collar and the adaptor define at least part of a housing space having the secondary seal housed therein, and
the collar is fixed to the housing or the rotary shaft by screwing each of set screws into each of the threaded screw holes, whereby to bring the restriction piece into contact with the adaptor and by moving the collar and the adaptor in a same axial direction in a state in which the adaptor and the secondary seal are fitted on an outer periphery surface or an inner periphery surface of the collar and sandwiched between a housing side member or a rotary shaft side member, the housing side member being the housing or a member fixed to the housing, the rotary shaft side member being the rotary shaft or a member fixed to the rotary shaft.

2. The bellows mechanical seal according to claim 1, wherein
the collar has the restriction piece extending to the inner diameter side and the outer diameter side.

3. The bellows mechanical seal according to claim 2, wherein
the restriction piece and the adaptor are in an endless annular shape.

4. The bellows mechanical seal according to claim 2, wherein
the adapter is provided with a step portion extending to an outer peripheral side or an inner peripheral side, and
the restriction piece is brought into contact with the step portion in an axial direction.

5. The bellows mechanical seal according to claim 2, wherein
the secondary seal includes, as a main component, any of graphite, PTFE, and metal.

6. The bellows mechanical seal according to claim 1, wherein
the restriction piece and the adaptor are in an endless annular shape.

7. The bellows mechanical seal according to claim 6, wherein the adapter is provided with a step portion extending to an outer peripheral side or an inner peripheral side, and the restriction piece is brought into contact with the step portion in an axial direction.

8. The bellows mechanical seal according to claim 6, wherein the secondary seal includes, as a main component, any of graphite, PTFE, and metal.

9. The bellows mechanical seal according to claim 1, wherein the adapter is provided with a step portion extending to an outer peripheral side or an inner peripheral side, and the restriction piece is brought into contact with the step portion in an axial direction.

10. The bellows mechanical seal according to claim 9, wherein the secondary seal includes, as a main component, any of graphite, PTFE, and metal.

11. The bellows mechanical seal according to claim 1, wherein the secondary seal includes, as a main component, any of graphite, PTFE, and metal.

12. The bellows mechanical seal according to claim 1, wherein the secondary seal includes, as a main component, any of graphite, PTFE, and metal.

* * * * *